United States Patent
McIntosh et al.

(10) Patent No.: US 6,965,664 B1
(45) Date of Patent: Nov. 15, 2005

(54) SYSTEM, METHOD, AND COMPUTER-READABLE MEDIUM FOR ENABLING BOTH HEARING AND HEARING-IMPAIRED CALLERS TO ACCESS A RESOURCE

(75) Inventors: Jonathan P. McIntosh, Omaha, NE (US); Craig A. Webster, Omaha, NE (US); David W. Wearne, Papillion, NE (US)

(73) Assignee: West Corporation, Omaha, NE (US)

( * ) Notice: Subject to any disclaimer, the term of this patent is extended or adjusted under 35 U.S.C. 154(b) by 119 days.

(21) Appl. No.: 10/603,583

(22) Filed: Jun. 25, 2003

Related U.S. Application Data

(60) Provisional application No. 60/472,256, filed on May 21, 2003.

(51) Int. Cl.[7] ............................................. H04M 11/00
(52) U.S. Cl. .................... 379/52; 379/93.11; 379/88.14
(58) Field of Search ............................... 379/52, 88.01, 379/88.04, 88.11, 88.13, 88.14, 88.18, 93.09, 379/93.11, 100.15, 100.16, 386

(56) References Cited

U.S. PATENT DOCUMENTS

| | | | |
|---|---|---|---|
| 5,121,421 A | | 6/1992 | Alheim |
| 5,253,285 A | | 10/1993 | Alheim |
| 5,325,417 A | | 6/1994 | Engelke |
| 5,327,479 A | | 7/1994 | Engelke |
| 5,396,536 A | * | 3/1995 | Yudkowsky ................. 379/52 |
| 5,450,470 A | | 9/1995 | Alheim |
| 5,481,589 A | | 1/1996 | Morduch |
| 5,559,855 A | | 9/1996 | Dowens |
| 5,559,857 A | | 9/1996 | Dowens |
| 5,574,776 A | | 11/1996 | Leuca |
| 5,604,786 A | | 2/1997 | Engelke |
| 5,619,564 A | * | 4/1997 | Canniff et al. ............... 379/386 |
| 5,680,443 A | | 10/1997 | Kasday |
| 5,687,222 A | * | 11/1997 | McLaughlin et al. ......... 379/52 |
| 5,701,338 A | | 12/1997 | Leyen |
| 5,809,425 A | | 9/1998 | Colwell |

(Continued)

OTHER PUBLICATIONS

NXi Communications, Inc., NTS Extra Cost Options, Dec. 12, 2001, NXi Price List.

(Continued)

Primary Examiner—Wing Chan
(74) Attorney, Agent, or Firm—West Corporation

(57) ABSTRACT

Automated system, method, and computer-readable medium for enabling at least one given caller, who may be either a hearing caller or a hearing-impaired caller, to access functionality associated with at least one resource, such as via a telephone number made available to both hearing callers and hearing-impaired callers. The automated systems can comprise at least one computer-based subsystem adapted at least to receive a call from the given caller; issue at least a first prompt in a first format that requests at least a first response; receive a response after issuing the prompt and the at least further prompt; and route the call so as to provide the given caller access to the at least one resource depending on an analysis of the response. The system can include platforms (specialized or standard) for handling transactions with either the hearing caller or the hearing-impaired caller. Methods and computer-readable media for executing these methods are also disclosed.

55 Claims, 5 Drawing Sheets

Overall block diagram

U.S. PATENT DOCUMENTS

| | | |
|---|---|---|
| 5,912,952 A | 6/1999 | Brendzel |
| 6,002,749 A | 12/1999 | Hansen |
| 6,047,173 A | 4/2000 | Leyen |
| 6,078,650 A | 6/2000 | Hansen |
| 6,421,425 B1 | 7/2002 | Bossi |
| 6,487,281 B1 * | 11/2002 | Crook .................. 379/100.15 |

OTHER PUBLICATIONS

911 Helpful Tips, www.aacog.com, May 28, 2003, Alamo Area Council of Governments.

911 Response Center Equipment, www.ttyweb.com, May 28, 2003, TTY-TDD Store.

* cited by examiner

Overall block diagram

Overall process flow performed by system shown in Figure 1

More detail on issuing respective prompts

More detail on analyzing and processing various types of callers

Diagram of components

SYSTEM, METHOD, AND COMPUTER-READABLE MEDIUM FOR ENABLING BOTH HEARING AND HEARING-IMPAIRED CALLERS TO ACCESS A RESOURCE

CROSS-REFERENCE TO RELATED APPLICATIONS

This patent application claims the benefit of the filing date of U.S. provisional application Ser. No. 60/472,256, filed on May 21, 2003, and entitled "SYSTEMS, METHODS, AND COMPUTER-READABLE MEDIUM FOR SERVING BOTH HEARING AND HEARING-IMPAIRED CALLERS USING A SINGLE TELEPHONE NUMBER" and the entire contents thereof are incorporated herein by this reference as if reproduced verbatim.

BRIEF DESCRIPTIONS OF THE DRAWINGS

DETAILED DESCRIPTION OF ILLUSTRATIVE EMBODIMENTS

Figure 1:
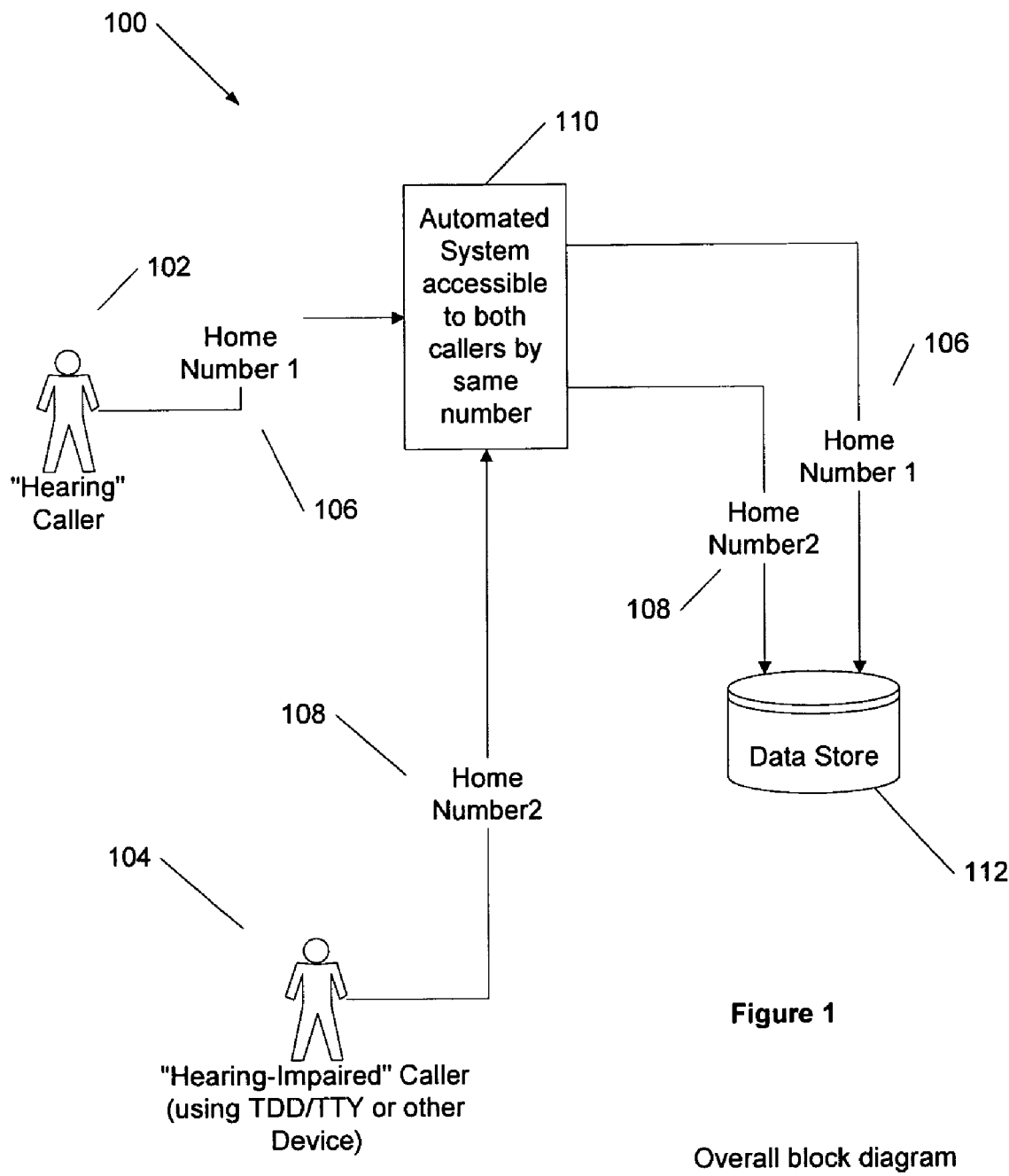
FIG. 1 is a high level block diagram illustrating the overall function of a system 100 provided according to an illustrative but not limiting embodiment of the invention as discussed herein.

As shown in FIG. 1, a block diagram illustrating the overall function performed by an illustrative but non-limiting embodiment of a system 100 as described herein, a "hearing" caller 102 and a "hearing-impaired" caller 104 may call or otherwise contact an automated system 110 using the same designated or given phone number to provide or submit information, such as their respective home phone numbers 106 and 108, to be listed in a data store 112, such as a nationwide do-not-call list. The given phone number may be communicated to the callers 102 and 104 through any number of methods, including advertisements, public service announcements, or other notices taking any suitable tangible or intangible form or transmitted or delivered using any medium known to those skilled in the art.

The term "hearing caller" 102 is used herein to designate a "hearing" caller 102 who has natural hearing capabilities sufficient to enable that caller 102 to communicate using his/her voice over the public switched telephone network (PSTN) without unreasonable difficulty, or who uses a device, such as a hearing aid, to amplify signals from the PSTN sufficiently to enable the caller 102 to communicate directly using voice over the PSTN.

The term "hearing-impaired" caller 104 is used to refer to a caller who has a hearing impediment sufficient to hinder his or her ability to communicate using his/her voice over the PSTN, and who may need the assistance of mechanical, electronic, acoustic, or other types of devices to use the PSTN, typically but not necessarily, using signals other than the caller's voice. Those skilled in the art will understand that these two terms are not used in a strict medical sense, but instead that these terms are to be interpreted as defined herein. For example, the hearing-impaired caller 104 need not be "clinically deaf" as that term is defined in the medical field, but instead may need the assistance of a device, such as a Telecommunications Device for the Deaf/Tele-Type-writer (TDD/TTY) device, to communicate over the PSTN using a signal other than his/her own voice. Preferably, the automated system 110 automatically determines, using the teachings herein, whether a given call to the given or designated telephone number originates from a hearing caller 102 or a hearing-impaired caller 104. The latter may be calling using a TDD/TTY or other assisting device, and the system 110 processes the call accordingly.

As further definitional matters, the term "given phone number" refers to a single shared phone number enabling all potential callers, whether hearing callers 102 or hearing-impaired callers 104, to dial the same telephone number to obtain the services provided by or associated with the automated system 110 or the data store 112. The term "data store" 112 refers to a database or other data structure that can be constructed using known software and hardware readily available from a variety of database software and server vendors. Data store 112 can be realized using either relational or object-oriented database technologies. One non-limiting example of this data store 112 is a do-not-call (DNC) list, which (as an illustrative but non-limiting example) can list persons who do not wish to be contacted during outbound telemarketing campaigns. Such DNC lists can be maintained by private entities (trade or industry groups such as the Direct Marketing Association, or individual telemarketing or teleservices firms), or can be sanctioned and/or maintained by governmental entities (national, state, regional, provincial or local).

In the specific context of implementing the data store 112 as a nationwide DNC list, governmental regulations may require that the automated system 110 involved in the implementation of such DNC list be accessible to both hearing callers 102 and hearing-impaired callers 104 via a single given telephone number, rather than having the automated system 110 provide respective first and second phone numbers by which hearing callers 102 and hearing-impaired callers would access the automated system 110. This second phone number would be supported by specific equipment enabling the hearing-impaired caller 104 to communicate using whatever specialized assisting devices may be necessary to allow he hearing-impaired caller 104 to communicate over the PSTN.

While the various drawing figures illustrate uni-directional data flows, those skilled in the art will recognize that these flows are shown only for the purposes of convenience, clarity, and conciseness in illustrating the flow of certain data or processing. Moreover, those skilled in the art will recognize that the drawings and discussion herein do not foreclose or exclude other types of data flows, for example bi-directional data flows or flows of data content other than those shown in the drawings.

Figure 2:
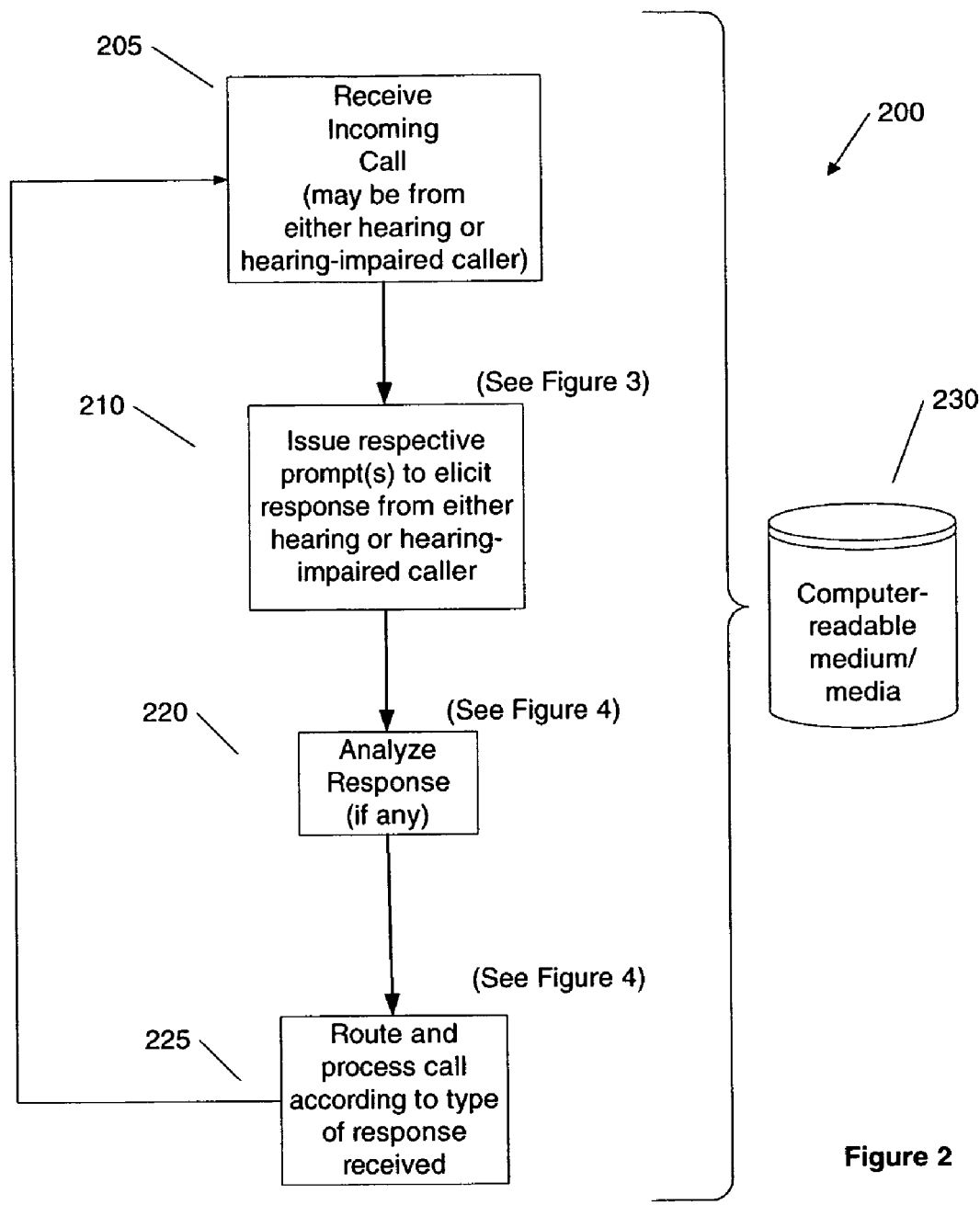
FIG. 2 is a high level flowchart 200 of a process flow performed by the system 100 shown in FIG. 1.

FIG. 2 is a flow chart 200 illustrating an overall process flow performed by the system 100 shown in FIG. 1. The process flow begins at block 205, where the incoming call is received, typically (but not necessarily) over the PSTN. More generally, any communications network, or any component thereof, capable of transmitting voice may be suitable for practicing the invention as described herein. Non-limiting examples might include technologies such as Voice Over IP, ISDN, DSL, Broadband, or any other networking or communications technology, in addition to the PSTN. Other suitable technologies could include components that perform speech recognition, text-to-speech conversion, global, regional, or local computer networking, video-based communication, or the like. This incoming call originates from either a hearing caller 102 or a hearing-impaired caller 104, both of whom may dial a single telephone number supported by the automated system 110 as shown in FIG. 1. At block 210, the system 100 issues one or more respective prompts so as to elicit a response from either a hearing caller 102 or a hearing-impaired caller 104 (or from a device used by the hearing-impaired caller 104, such as a TTD/TTY device). The specific prompt or prompts are discussed below in further detail in connection with FIG. 3.

At block 220, the system 100 analyzes a response, if any, to the prompts issued in block 210, which response may come from a hearing caller 102 or a hearing-impaired caller 104 (or a device used by such caller 104). The focus of block 220 is to identify what type of caller is contacting the system 110 based on the response received, so as to process and respond to the call using the appropriate platform. At block 225, the system routes and processes the call according to the type or response received. In other words, the type of response received from either a hearing caller 102 or a hearing-impaired caller 104 (who may be using some assisting device) will determine the routing and processing of the given call. The processing performed in blocks 220 and 225 are illustrated below and discussed in more detail in connection with FIG. 4. After concluding processing of a given call, the process flow 200 loops back to block 205 to await the next incoming call.

Figure 3:
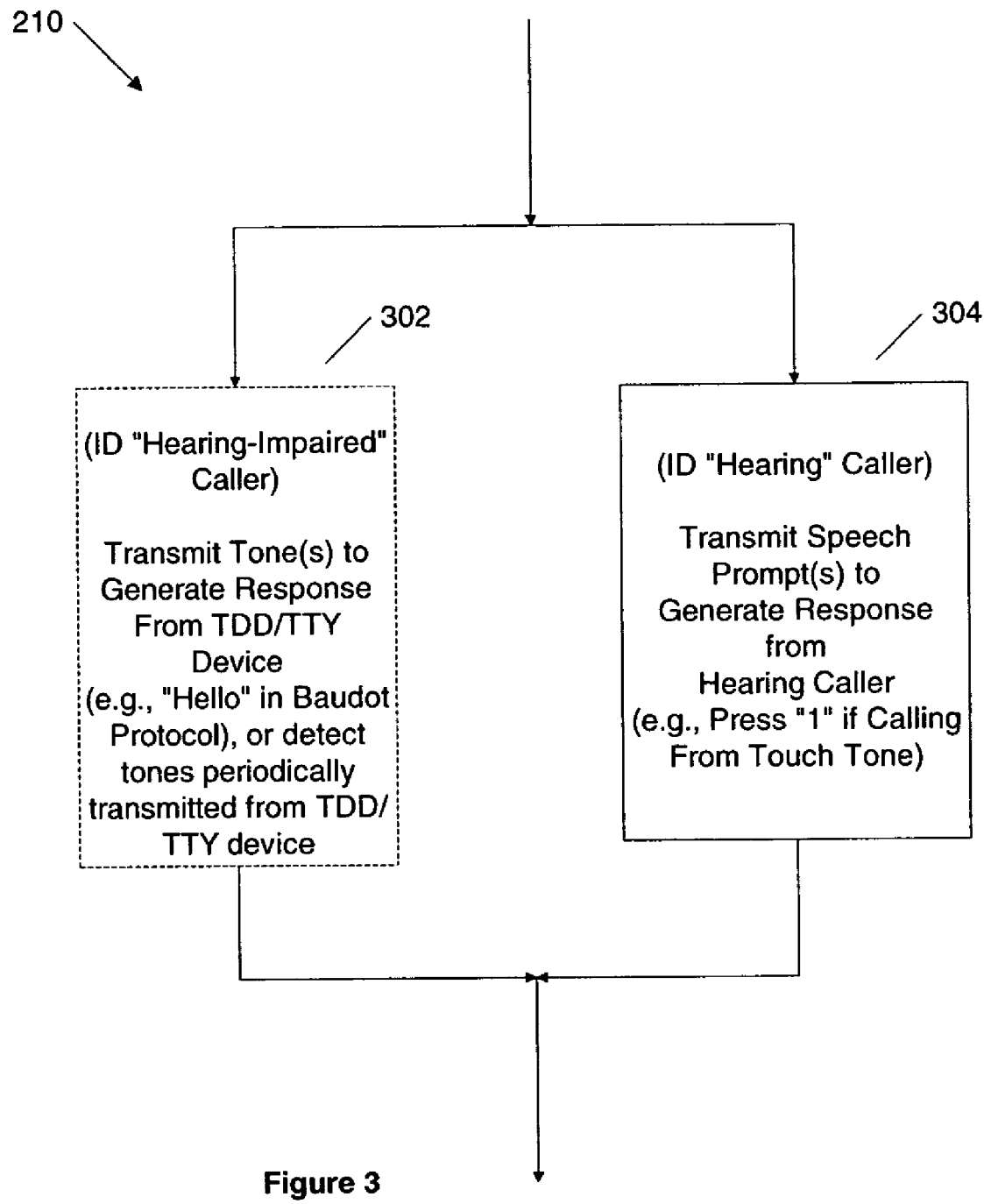
FIG. 3 is a flowchart illustrating various aspects of processing performed during the prompt issuing block 210 shown in FIG. 2.

FIG. 3 is a flowchart illustrating various aspects of the processing performed in block 210 shown in FIG. 2. Process flow enters from block 205 shown in FIG. 2. At block 302, the system 100 issues a prompt in a first format designed or tailored to identify a hearing-impaired caller 104 by triggering a response from a device (such as a TDD/TTY device) used by or associated with that hearing-impaired caller 104, such as known TDD/TTY devices. One non-limiting embodiment illustrative of the instant invention can include transmitting a tone(s) or specially-defined signal(s) chosen to generate or trigger a response from such a device. An illustrative but non-limiting example the context of TDD/TTY devices can include transmitting a tone or tones corresponding to the text "hello" as formulated according to the known Baudot protocol, which is discussed in more detail below. As known in the art of TDD/TTY devices, such devices do not continuously emit signals as do conventional modems. Instead, such TDD/TTY devices only transmit signals when the user types characters, or can transmit signals periodically if so configured. For example, certain TDD/TTY devices may be configured to transmit signals representing the text "Hello" at a pre-defined interval. When the invention is practiced with such devices, it may not be necessary to issue the prompt represented by block 302. Accordingly, the prompt issued by the system 100 as represented in block 302 is intended to generate or trigger this response from the TDD/TTY device, which response would thereby indicate to the system 100 that a hearing-impaired caller 104 using such a device is on the line.

Turning to block 304, the system 100 issues at least a second prompt in a second format designed or tailored to identify a hearing caller 102 by causing that caller 102 to respond in some way to the prompt issued in block 304. In illustrative but non-limiting embodiments of the invention, the prompt represented in block 304 may comprise a speech or verbal prompt intended to generate a specific response from the hearing caller 102. An illustrative but non-limiting example might be a verbal pre-recorded prompt directing the caller 102 to "press 1 if calling from a touchtone phone". However, other prompts may be equally suitable and can be constructed by those skilled in the art without departing from the scope of the invention as described herein. If the caller responds as requested to the speech/voice prompt, for example by pressing a keypad to generate an expected or requested tone(s) or signal(s), the caller is most likely a hearing caller 102. Prompting the caller to generate one or more dual-tone multi-frequency (DTMF) tones is one non-limiting example of identifying a hearing caller 102.

Strictly for convenience in illustrating and discussing the processing shown in FIG. 3, the respective blocks 302 and 304 are shown as proceeding in parallel. However, those skilled in the art will understand that the configuration shown in FIG. 3 is non-limiting, and that the processing performed by the respective blocks 302 and 304 could proceed in series, or in any other fashion or arrangement apparent to those skilled in the art. Those skilled in the art will further understand that the issuance of the respective prompts shown in blocks 302 and 304 may be synchronized with one another, may be completely asynchronous with one another, or further that the prompts may be issued in any chronological relationship to one another. For example, the prompt corresponding to block 302 might be issued first and the prompt corresponding to block 304 might be issued only if no response is received after a given period of time, and vice versa. Also, both prompts could be issued at approximately the same time, or simultaneously with one another. In still further examples, a first prompt in a first format (either voice prompt or TDD/TTY message) could be issued, and if no response has been received after a predefined time period, the other prompt could be issued in the other format (either TDD/TTY or voice prompt, whichever was not issued before). If neither prompt generates a response, the call will most likely be terminated due to an unresponsive caller.

Figure 4:
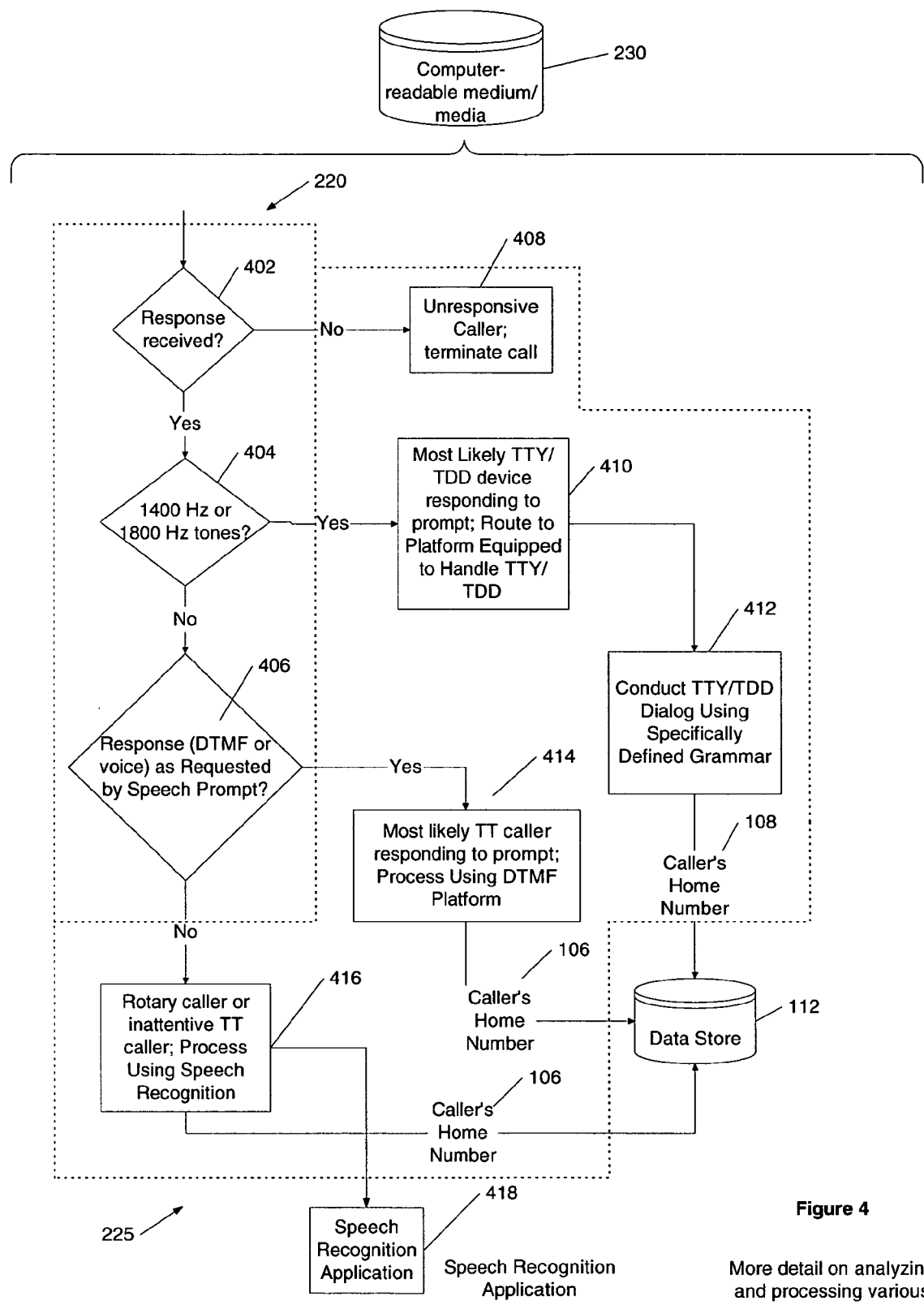
FIG. 4 is a flowchart illustrating various aspects of processing performed during the response analysis block 220 and the call routing block 225 shown in FIG. 2.

FIG. 4 illustrates various aspects related to analyzing and processing different types of calls from respective callers 102 or 104 and expands further on the processing represented by blocks 220 and 225 shown in FIG. 2, as represented by the dashed outlines shown in FIG. 4. Processing enters from block 210 in FIG. 2 and begins at decision block 402, which determines whether any response to the prompts issued in block 210 of FIG. 2 has been received from the caller, who may be a hearing caller 102 or a hearing-impaired caller 104. If no response whatsoever has been received (from either a hearing caller 102 or a hearing-impaired caller 104, or a device associated therewith), then the process proceeds to block 408, which indicates an unresponsive caller 102 or 104. Under these circumstances, the process cannot operate further, and the call is considered terminated. The process would then branch back to block 205 in FIG. 2 to await the next call.

If a response of some sort is received from the caller 102 or 104 (or a device associated therewith), the method proceeds to decision block 404, which determines whether a tone(s) or signal(s) having a frequency of approximately 1400 or 1800 Hz has been received in response to the prompts issued in block 210 as shown in FIG. 2 or 3 (more particularly block 302) in FIG. 3. Under the known Baudot protocol, a logical "1" (or "mark") is indicated by a 1400-hertz tone, while a logical "0" (or "space") is indicated by an 1800-hertz tone. As known in the art, Baudot-compatible devices communicate at 45.5 baud and utilize a 5-bit code used only by Baudot-compatible devices. The term "approximately" is used herein to indicate that the frequency of the tone(s) or signal(s) received or transmitted by the automated system 110 need not be exactly 1400 or 1800 Hz, but instead may vary from these frequencies due to distortion. equipment or software limitations, noise affecting transmission media, or other environmental conditions affecting a given implementation of the invention. Thus, the frequencies of the signals corresponding to logical "1" or logical "0" may vary from the frequencies specified by the Baudot protocol without departing the scope of the invention.

Those skilled in the art will further recognize that the recognition of the approximately 1400 hertz or 1800 hertz signal(s) in block 404, and the issuance of a prompt to trigger such signals in block 210 of FIG. 2 and in block 302 in FIG. 3, provide illustrative rather than limiting embodiments of the invention, specific to an example implemented based on Baudot communication. Those skilled in the art will further recognize that if other communication protocols are appropriate for a given application of the invention, or if the Baudot protocol is modified or supplanted in favor of another communications protocol suitable or appropriate for the hearing-impaired, the nature and characteristics (such as frequency) of the tones or signals handled in blocks 404 and 410 may vary from those illustrated respectively in FIGS. 2 and 4 and discussed herein, while still remaining within the scope of the invention. Likewise, the signal(s) or tone(s) representing the prompts issued in blocks 210 (FIG. 2) and 302 (FIG. 3) may vary as well under such circumstances.

Those skilled in the art will further recognize that the components implementing decision block 404 could be configured to recognize either a specific, discrete tone or signal or a sequence of tones or signals as indicating the presence of a hearing-impaired caller 104 who may be using an assisting device. Further, the nature and content of these recognized tone(s) signal(s) may vary in response to the types of devices or technology known and used by hearing-impaired callers 104 to access the PSTN or other communication networks.

At decision block 404, if an approximately 1400 hertz tone(s) or a 1800 hertz tone (or other suitable discriminating signal) has been received, then most likely the caller contacting the system 100 is a hearing-impaired caller 104 who is using a TDD/TTY device to communicate over the PSTN. Accordingly, the process proceeds to block 410, where the call from the hearing-impaired caller 104 is routed to a processing platform equipped to handle TTY/TDD calls.

The method then proceeds to block 412, which represents the process of conducting a TTY/TDD-based dialog with the hearing-impaired caller 104 to execute the transaction sought by the caller 104, such as storing caller-specific information in the data store 112. This dialog may be, but need not necessarily be, conducted using a specifically defined grammar. While conducting this dialog with the hearing-impaired caller 104, for example to enter the home number 108 of the hearing-impaired caller 104 into the data store 112 in the form of a DNC list, it may be necessary to limit, via the grammar, the possible responses from the hearing-impaired caller 104 that will be recognized and processed. In short, it may be necessary to define this grammar to realize a closed-ended dialog truncated as appropriate to conduct the transaction sought by the hearing-impaired caller 104, rather than an open-ended, conversational-type dialog. Curtailing the dialog in this manner makes it possible to automate the entire transaction between the hearing-impaired caller 104 and the automated system 110, thereby eliminating the labor expense and complexity of a telecommunications relay service (TRS) or an operator services for the deaf (OSD) facility. Also, the grammar could be tailored as appropriate given that the caller 104 is hearing-impaired and that the Baudot protocol is a relatively low-bandwidth protocol by contemporary standards. Thus, the interaction supported by this grammar may or may not consist of merely sending Baudot code representations of existing voice prompts. Specifically, the prompts may be shortened to take advantage of known Baudot conventions, or otherwise modified to facilitate efficient interaction with the hearing-impaired caller 104. Continuing the non-limiting DNC list example discussed above, block 412 obtains the home number 108 of the hearing-impaired caller 104 and enters it into the data store 112.

Returning to decision block 404, if neither a 1400-hertz tone nor an 1800-hertz tone (nor any other type of discriminating signal or signals) is received, processing proceeds to decision block 406. Block 406 determines whether a tone or signal, such as a DTMF tone, as requested, or approximately or substantially as requested by the speech prompt issued in block 304 (FIG. 3) was received. If so, the process proceeds to block 414, where the method determines that the caller is most likely a hearing caller 102 who has responded as requested to the prompt issued in block 304, and further that this call should be processed using a platform such as a DTMF-based platform. In other alternate embodiments, the prompt could ask for voice or speech input from the caller 102, rather than DTMF input. For example, the prompt could request that the caller say "Proceed" or some other command, which in turn could be analyzed using a speech-recognition engine. If the caller 102 responds to the prompt (whether by DTMF, voice, or otherwise), the method concludes that the call should be processed using a platform that can support hearing callers 102, such as a DTMF-based platform or a speech-enabled platform.

Those skilled in the art will recognize that the nature and content of DTMF signals are well known and established. The terms "substantially" and "approximately" are used here with the same meaning as discussed above in the context of processing TTD/TTY signals.

Continuing with the DNC list example above, the method functions to obtain the home phone number 106 of the hearing caller 102, and to store it in the data store 112. The DTMF-based platform can be configured to obtain this information using known technology to conduct a dialog with the hearing caller 102. This dialog could proceed by having the system prompt the hearing caller 102 via speech/voice prompts, with the hearing caller 102 responding with DTMF keystrokes or speech/voice as necessary to conduct whatever transactions are sought by the hearing caller 102. However, this scenario is illustrative in nature, and is not intended to limit the scope of the invention.

Returning to decision block 406, if a response other than DTMF or touchtone signals or tones responsive to the prompt issued in block 304 is received, the method proceeds to block 416. Non-limiting examples of the types of responses that would cause the flow to reach block 416 can include an incorrect DTMF key-in, the caller speaking instead of keying-in DTMF digit(s) as requested, incorrect voice responses, or the like. Block 416 corresponds to a caller, most likely a hearing caller 102, who may be calling from a rotary or non-touchtone telephone handset, or may be an inattentive but hearing caller 102 who is using a DTMF or touchtone handset and provides the wrong DTMF or voice input in response to the prompt issued in block 304 (FIG. 3). In this situation, the method functions to conduct a speech-based dialog with the caller 102, and processes responses from the hearing caller 102 using known speech-recognition technology. In block 416, the hearing caller 102 responds via voice, while in block 414, the hearing caller 102 responds via DTMF keystrokes. Alternatively, if the hearing caller 102 keyed-in the wrong DTMF tone, the method could re-prompt the hearing caller 102 to enter the required DTMF tone, and continue to block 414. As still another alternative, if the hearing caller 102 responds with the incorrect DTMF tone, the method can conclude nevertheless that the hearing caller 102 is using a touchtone phone and route the call to the DTMF platform to attempt the speech-based dialog discussion above. The latter two alternatives are symbolized in FIG. 4 by the dashed line 418.

Speech recognition technology suitable for implementing block 416 is readily available from a variety of vendors, including but not limited to Nuance Corporation of Menlo Park, Calif. In the DNC list example discussed above, the method functions to obtain the caller's home phone number 106 and store it in the data store 112 in the form of the DNC list.

Those skilled in the art will recognize that various embodiments of the invention can include varying the relative order of decision blocks 402, 404, and 406 from that shown in the illustrative but non-limiting embodiment of FIG. 4. Specifically, the ordering of blocks 402, 404, and 406 could be varied, such that the method tests first for the correct DTMF response from hearing caller 102 using a touchtone phone, then for the tones/signals associated with a device (such as a TDD/TTY device) used by a hearing-impaired caller 104. Also, these decision blocks could be conducted in parallel. The key activity represented in FIG. 4 is the routing of calls to the appropriate platform for processing based on responses to the prompts discussed above. Various forms of decision logic that realize this goal may be appropriate in different implementations or applications of the teachings herein.

Figure 5:
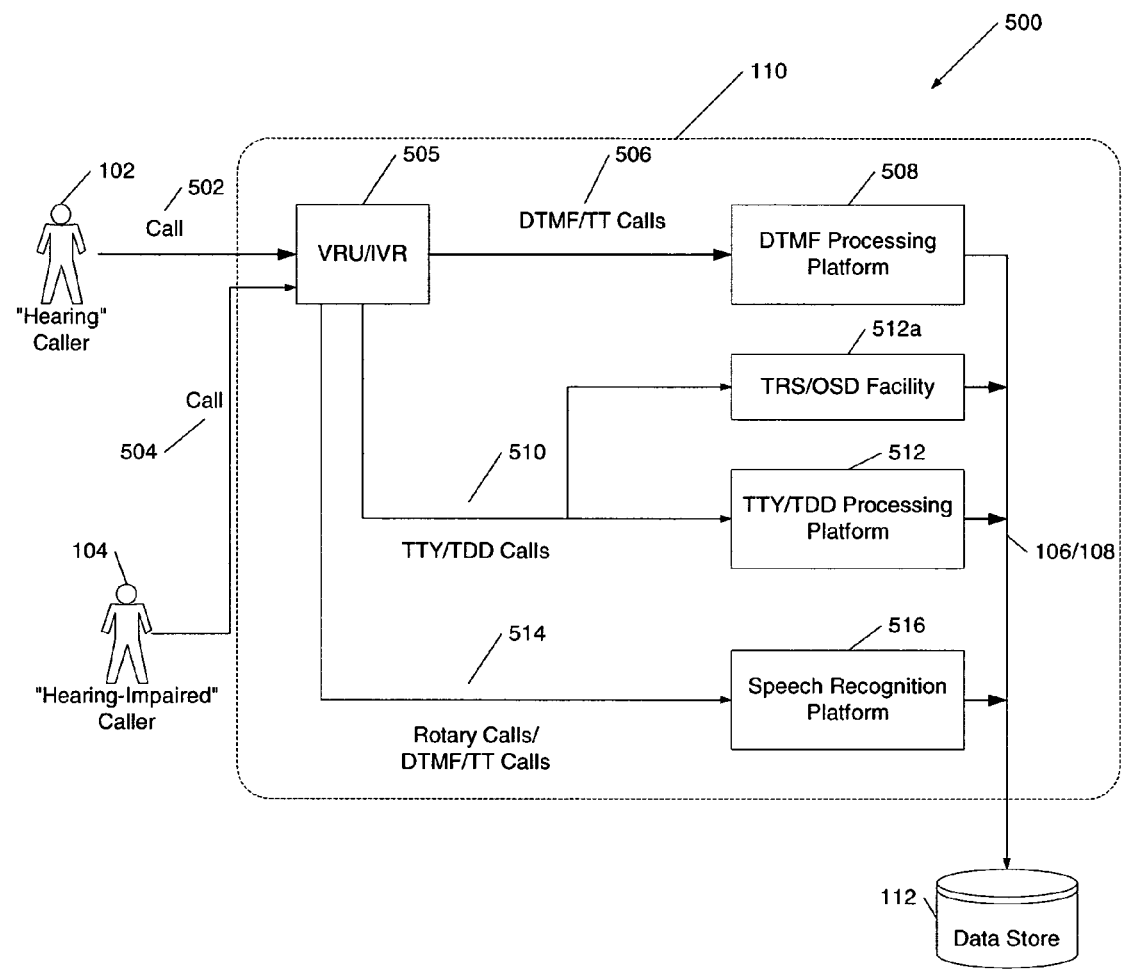
FIG. 5 is a block diagram 500 illustrating in more detail various components that can be used to implement the invention as described herein.

FIG. 5 is a block diagram 500 illustrating various components suitable for implementing the invention as described herein. A hearing caller 102 and a hearing-impaired caller 104 initiate respective calls 502 and 504 using a single phone number, which is serviced by an automated system 110 comprising at least in part computer-based sub-systems and/or telecommunications equipment such as a voice response unit (VRU) 505. VRUs are also referred to in the industry as interactive voice response (IVR) units. The automated system 110, more particularly the voice response unit 505, can be configured to perform the functions discussed above to route incoming calls 502 and 504 to the appropriate platform 508, 512, 512a, or 516 for processing, using, for example, the logic shown and discussed above in connection with FIG. 4. Calls 506 placed by a hearing caller 102 using a DTMF/touchtone handset are routed to the DTMF platform 508, which may be implemented as a separate standalone component, or integrated into the VRU/IVR 505.

The VRU 505 can also be configured to identify calls 514 placed by the hearing caller 102 using rotary telephone equipment, or hearing callers 102 who fail to respond as requested to enter appropriate DTMF/touchtone signals into a touchtone keypad handset. Also, callers 102 may issue speech or voice commands in response to prompts, which speech or voice commands result in such callers being routed to speech recognition platform 516. These calls are ultimately handled on a speech recognition platform 516 implemented using suitable speech recognition technology as discussed above. As with DTMF platform 508, the speech recognition platform 516 may be implemented as a separate, standalone component, or integrated into the VRU/IVR 505.

The VRU 505 is also configured to identify calls 504 from hearing-impaired callers 104 for processing using a dedicated TTY/TDD processing platform 512. As an alternative, such calls 504 can be routed to a conventional TRS/OSD facility 512a. Thus the method and system of the various aspects of the invention as described herein can identify and divide incoming calls from callers 102 and/or 104 into three broad classes represented by the arrows 506, 510, and 514 for handling by the respective platforms 508, 512, 512a, and 516. In the non-limiting DNC list example discussed above, these respective platforms 508, 512, 512a, or 516 obtain the relevant telephone numbers 106 and 108 for storage in the data store 112 in the form of the DNC list.

Methods and systems provided according to the teachings herein may enable construction and use of an automated system that provides a pre-defined, single telephone number to enable both hearing callers 102 and hearing-impaired callers 104 to provide pertinent information to be stored in data store 112 in the form of a DNC list, rather than establishing two separate phone numbers for hearing callers 102 and hearing-impaired callers 104, respectively, and supporting each of these phone numbers with appropriate equipment based on the types of calls received at that number. In contrast with other systems that effectively impose the routing function upon the callers themselves, the invention as disclosed herein preferably performs this routing automatically, making the data store 112 accessible to all callers 102 and 104 using the single telephone number, thereby complying with governmental regulations that may be applicable to the construction and maintenance of a nationwide DNC list.

Those skilled in the art will appreciate that while the drawing figures and this description discuss listing of phone numbers in the data store 112 in the form of a DNC list, the concepts discussed herein may be equally applicable to perform other functions. Generalizing beyond the DNC list, the invention herein may be deployed to enable both hearing and hearing-impaired callers 102 and/or 104 to access or utilize some resource of which the data store 112 in the form of the DNC list is but one illustrative example. More particularly, the invention as disclosed herein may be applied in the above context to enable the callers 102 and 104 to access or otherwise utilize the resource (such as the DNC list).

As used herein, the term "platform" refers to any hardware and/or software used to support the transactions described herein with the callers 102 or 104. These platforms may be customized or configured to realize the functions discussed herein. Further, these platforms can reside on either the VRU or as separate, stand-alone components or modules in communication with the VRU or other computer-based sub-system.

Other illustrative embodiments of the invention can include building a look-up table for various callers 102 and/or 104, indexing it by the caller's telephone number (as provided by Automatic Number Identification (ANI) technology or other means) after a first contact with a given caller, storing data in the table indicating whether the caller associated with the telephone number is hearing or hearing-impaired, and then referring to this table entry during a second or further contact with the given caller. This second contact can then be routed to the appropriate platform based on this table look-up. Those skilled in the art will recognize that this look-up table could be compiled based only upon the first interaction between the caller and the automated system 110, or based upon other interactions between the callers 102 or 104 and other systems or entities. In other illustrative embodiments, whether the caller is a hearing caller 102 or a hearing-impaired caller 104 can be inferred based on past transactions conducted by the caller, for example transactions conducted with entities other than the automated system 110. For an example of suitable technology for analyzing past transactions and drawing conclusions therefrom, see U.S. Pat. No. 6,055,513, the contents of which are incorporated herein by this reference as if reproduced verbatim.

A suitable application program can implement software residing on the computer-readable medium or media 230 (FIGS. 2 and 4) and embodying the various aspects of the method discussed herein and shown in the drawing figures, and can be coded using any suitable programming or scripting language. However, it is to be understood that the invention as described herein is not dependent on any particular operating system, environment, or programming language. Illustrative operating systems include without limitation LINUX, UNIX, or any of the Windows™-family of operating systems, and illustrative languages include without limitation a variety of structured and object-oriented languages such as C, C++, Visual Basic, or the like.

As those skilled in the art will understand, the program of instructions can be loaded and stored onto a program storage medium or device 230 readable by a computer or other machine, embodying a program of instructions executable by the machine to perform the various aspects of the invention as discussed and claimed herein, and as illustrated in the drawing figures. Generally speaking, the program storage medium 230 can be implemented using any technology based upon materials having specific magnetic, optical, semiconductor or other properties that render them suitable for storing computer-readable data, whether such technology involves either volatile or non-volatile storage media. Specific examples of such media can include, but are not limited to, magnetic hard or floppy disks drives, optical drives or CD-ROMs, and any memory technology based on semiconductors or other materials, whether implemented as read-only or random access memory. In short, this embodiment of the invention may reside either on a medium directly addressable by the computer's processor (main memory, however implemented) or on a medium indirectly accessible to the processor (secondary storage media such as hard disk drives, tape drives, CD-ROM drives, floppy drives, or the like). Consistent with the above teaching, program storage device 230 can be affixed permanently or removably to a bay, socket, connector, or other hardware provided by the cabinet, motherboard, or other component of a given computer system.

Those skilled in the art will also understand that a computer programmed in accordance with the above teaching using known programming languages provides suitable means for realizing the various functions, methods, and processes as described and claimed herein and as illustrated in the drawing figure attached hereto.

Various embodiments of the invention are described above to facilitate a thorough understanding of various aspects of the invention. However, these embodiments are to be understood as illustrative rather than limiting in nature, and those skilled in the art will recognize that various modifications or extensions of these embodiments will fall within the scope of the invention, which is defined by the appended claims.

We claim:

1. An automated system enabling at least one given caller, who may be one of a hearing caller and a hearing-impaired caller, to access functionality associated with at least one resource, the automated system comprising at least the following:
   at least one computer-based subsystem including at least the following:
      means for receiving a call from the given caller;
      means for issuing at least one prompt in at least a first format, the prompt requesting at least a first response;
      means for evaluating:
         first, whether a response was received after issuing the prompt;
         second, whether the response is indicative of a hearing-impaired caller or of a hearing caller; and
      means for routing the call so as to provide the given caller access to the at least one resource depending on an analysis of the response.

2. The automated system of claim 1, wherein the at least one computer-based subsystem includes means for receiving the call from the given caller via a common telephone number dialed by both hearing callers and hearing-impaired callers.

3. The automated system of claim 1, wherein the at least one computer-based subsystem includes means for issuing at least a further prompt in at least a further format, the at least further prompt requesting at least a further response, and to receive the response after issuing the further prompt.

4. The automated system of claim 3, wherein the first format is different than the further format.

5. The automated system of claim 1, wherein the at least one computer-based subsystem includes means for detecting a pre-defined, signal transmitted from a device that is configured to transmit the signal periodically.

6. The automated system of claim 1, wherein the first format is a speech-based format.

7. The automated system of claim 1, wherein the prompt requests the given caller to enter at least one DTMF tone in response to the prompt.

8. The automated system of claim 1, wherein the first format is a format suitable for hearing-impaired callers.

9. The automated system of claim 1, wherein the first format is a format suitable for hearing callers.

10. The automated system of claim 1, wherein the first format is a Baudot-compliant format.

11. The automated system of claim 1, wherein the first format is selected so as to cause a device associated with the hearing-impaired caller to generate at least one signal in the first format in response to the prompt.

12. The automated system of claim 3, wherein, for all given callers, the computer-based subsystem includes means for issuing the prompt in the first format before issuing the further prompt in the further format.

13. The automated system of claim 3, wherein, for at least some given callers, the computer-based subsystem includes means for issuing the prompt in the first format before issuing the further prompt in the further format.

14. The automated system of claim 3, wherein the computer-based subsystem includes means for issuing the prompt at approximately the same time as the further prompt.

15. The automated system of claim 1, wherein the computer-based subsystem includes means for issuing the prompt, and after a pre-defined period of time expires with no response to the prompt, to issue the further prompt.

16. The automated system of claim 8, wherein the computer-based subsystem includes means for issuing the prompt in the format suitable for hearing-impaired callers before a device associated with a given hearing-impaired caller transmits any data to the automated system.

17. The automated system of claim 1, wherein the computer-based subsystem includes means for issuing at least one prompt for the given caller to respond to the at least one prompt by generating at least one dual tone multi-frequency (DTMF) signal.

18. The automated system of claim 1, wherein the computer-based subsystem includes means for issuing at least one prompt for a device associated with the given caller to respond to the computer-based subsystem.

19. The automated system of claim 1, wherein the computer-based subsystem includes a means for issuing at least one prompt for a TDD/TTY device associated with the given caller to respond to the computer-based subsystem.

20. The automated system of claim 1, wherein the computer-based subsystem includes means for issuing at least one prompt requesting that the given caller generate at least one DTMF tone by pressing at least one key on a keypad.

21. The automated system of claim 1, wherein the computer-based subsystem includes means for issuing at least one prompt requesting that the given caller provide at least one voice response to the prompt.

22. The automated system of claim 1, wherein the computer-based subsystem includes means for re-issuing the prompt should the given caller respond to the prompt incorrectly.

23. The automated system of claim 1, wherein the computer-based subsystem includes means for routing the call to a speech-recognition platform should the given caller respond to the prompt incorrectly.

24. The automated system of claim 1, wherein the computer-based subsystem includes means for routing the call to a DTMF platform should the given caller respond to the prompt incorrectly.

25. The automated system of claim 1, wherein the computer-based subsystem includes means for identifying at least one signal having a frequency of approximately 1,400 Hertz.

26. The automated system of claim 1, wherein the computer-based subsystem includes means for identifying at least one signal having a frequency of approximately 1,800 Hertz.

27. The automated system of claim 1, wherein the computer-based subsystem includes means for identifying a plurality of signals, at least one of which plurality of signals has a frequency of approximately 1,800 Hertz.

28. The automated system of claim 1, wherein the computer-based subsystem includes means for identifying a plurality signals, at least one of which plurality of signals has a frequency of approximately 1,400 Hertz.

29. The automated system of claim 1, wherein the computer-based subsystem includes means for identifying a plurality of signals, at least one of which signals has a frequency of approximately 1,400 Hertz and at least one of which signals has a frequency of approximately 1,800 Hertz.

30. The automated system of claim 3, wherein the computer-based subsystem includes means for identifying at least one signal that substantially matches at least one characteristic frequency that corresponds to a response requested in at least one of the prompt and the further prompt.

31. The automated system of claim 3, wherein the computer-based subsystem includes means for identifying at least one signal that substantially matches at least one frequency that is characteristic of a DTMF tone and that corresponds to a response requested in at least one of the prompt and the further prompt.

32. The automated system of claim 3, wherein the computer-based subsystem includes means for identifying at least one signal that substantially matches at least one DTMF frequency characteristic and that corresponds to a response other than a response requested in at least one of the prompt and the further prompt.

33. The automated system of claim 1, wherein the computer-based subsystem includes means for recognizing speech input from the at least one given caller.

34. The automated system of claim 1, wherein the computer-based subsystem includes means for routing the call to a DTMF platform based on a DTMF response from the given caller.

35. The automated system of claim 1, wherein the computer-based subsystem includes means for routing the call to a TDD/TTY platform based on a response received from a device associated with the given caller.

36. The automated system of claim 1, wherein the computer-based subsystem includes means for routing the call to a TDD/TTY platform based on a Baudot-compliant response received from a device associated with the given caller.

37. The automated system of claim 1, wherein the computer-based subsystem includes means for routing the call to a speech recognition platform based on a response from the given caller.

38. The automated system of claim 1, wherein the computer-based subsystem is a voice response unit.

39. The automated system of claim 1, wherein the computer-based subsystem includes means for performing a plurality of evaluations of the response in parallel.

40. The automated system of claim 1, further comprising a speech recognition platform, and wherein the computer-based subsystem includes means for routing the call for processing by the speech recognition platform based on a response from the given caller.

41. The automated system of claim 40, wherein the speech recognition platform includes means for processing the call so as to provide the given caller access to the resource in the form of a data store.

42. The automated system of claim 40, wherein the speech recognition platform includes means for processing the call so as to enable the given caller to submit data for entry into a data store.

43. The automated system of claim 40, wherein the speech recognition platform includes means for processing the call so as to enable the given caller to submit a telephone number for entry into a do-not-call list.

44. The automated system of claim 1, further comprising a TDD/TTY platform, and wherein the computer-based subsystem includes means for routing the call for processing by the TDD/TTY platform based on a response received from a device associated with the given caller.

45. The automated system of claim 44, wherein the TDD/TTY platform includes means for processing the call so as to provide the given caller access to the resource in the form of a data store.

46. The automated system of claim 44, wherein the TDD/TTY platform includes means for processing the call so as to enable the given caller to submit data for entry into a data store.

47. The automated system of claim 44, wherein the TDD/TTY platform includes means for processing the call so as to enable the given caller to submit a telephone number for entry into a do-not-call list.

48. The automated system of claim 44, wherein the TDD/TTY platform includes means for processing the call using a grammar that is specially defined for use with the resource.

49. The automated system of claim 1, further comprising a DTMF platform, and wherein the computer-based subsystem includes means for routing the call for processing by the DTMF platform based on a DTMF response from the given caller.

50. The automated system of claim 49, wherein the DTMF platform includes means for processing the call so as to provide the given caller access to the resource in the form of a data store.

51. The automated system of claim 49, wherein the DTMF platform includes means for processing the call so as to enable the given caller to submit data for entry into a data store.

52. The automated system of claim 49, wherein the DTMF platform includes means for processing the call so as to enable the given caller to submit a telephone number for entry into a do-not-call list.

53. A method for enabling at least one given caller, who may be one of a hearing caller and a hearing-impaired caller, to access functionality associated with at least one resource using a given telephone number that is available to both the hearing caller and the hearing-impaired caller, the method comprising at least the following:
receiving a call from the given caller placed to the telephone number;
issuing a prompt in a first format, the first prompt requesting a first response associated with the hearing caller;
issuing at least a further prompt in at least a further format, the at least further prompt requesting at least a further response, the further prompt requesting a further response associated with the hearing-impaired caller;
evaluating, first, whether a response was received to the prompt or the further prompt, and, second, whether a received response is the first response or the further response; and
routing the call so as to provide the given caller access to the at least one resource depending on the evaluating of the response.

54. Apparatus for enabling at least one given caller, who may be one of a hearing caller and a hearing-impaired caller, to register for a do-not-call (DNC) list by accessing an automated platform using a single given telephone number usable by both hearing and hearing-impaired callers, the apparatus comprising at least the following:
means for receiving a call from the given caller to register for the DNC list;
means for issuing a first prompt in a first format, the first prompt requesting a first response indicative of a hearing caller;
means for issuing at least a second prompt in at least a second format, the second prompt requesting a second response indicative of a hearing-impaired caller;
means for evaluating, after the first and the second prompts are issued:
first, whether a response to either prompt was received;
second, whether the response is indicative of a hearing-impaired caller or of a hearing caller; and
means for routing the call, based on the evaluation of the response, to one of a first automated platform adapted to support hearing callers and a second automated platform adapted to support hearing-impaired callers so as to enable the given caller to register for the DNC list via the first or the second automated platform.

55. A program storage device readable by a machine, tangibly embodying a program of instructions executable by the machine to perform a method for enabling at least one given caller, who may be one of a hearing caller and a hearing-impaired caller, to access functionality associated with at least one resource, the method comprising at least the following:
receiving a call from the given caller;
issuing a prompt in a first format, the first prompt requesting a first response;
issuing a further prompt in a second format, the further prompt requesting a further response;
evaluating, first, whether a response was received to the prompt or the further prompt, and, second, whether a received response is the first response or the further response; and
routing the call so as to provide the given caller access to the at least one resource depending on an analysis of the response.

* * * * *